United States Patent

Hollis, Jr.

[15] 3,647,244
[45] Mar. 7, 1972

[54] COUPLER FOR TRAILERS AND THE LIKE

[72] Inventor: Russell E. Hollis, Jr., Xenia, Ohio
[73] Assignee: General Processing Corporation, Crossville, Tenn.
[22] Filed: Jan. 12, 1970
[21] Appl. No.: 2,299

[52] U.S. Cl. ...................................................280/512
[51] Int. Cl. ...................................................B60d 1/06
[58] Field of Search.................280/512, 43.17, 43, 511, 507

[56] References Cited

UNITED STATES PATENTS

| | | | |
|---|---|---|---|
| 1,254,199 | 1/1918 | Brice | 280/512 |
| 2,435,024 | 1/1948 | Wagner | 280/512 |
| 2,884,261 | 4/1959 | Farr | 280/512 |
| R24,362 | 9/1957 | Nunn, Jr. | 280/512 |
| 2,982,567 | 5/1961 | Bolmes | 280/512 |

*Primary Examiner*—Benjamin Hersh
*Assistant Examiner*—Robert R. Song
*Attorney*—Price, Heneveld, Huizenga & Cooper

[57] ABSTRACT

A coupler for engaging ball-type hitches, having a movable jaw or tumbler controlled by a handle secured thereto such that both rotate about a common axis which is positioned below the center of the engaged ball and such that the jaw is rotatable upwardly and away from the ball to disengage the coupler therefrom. The jaw is positioned generally opposite a socket portion of the coupler housing to entrap the ball therebetween, and the housing defines a recess which receives said handle to lock the coupler in a ball-engaging condition, there being a spring which biases the handle toward such recess.

9 Claims, 7 Drawing Figures

PATENTED MAR 7 1972 3,647,244

INVENTOR.
RUSSELL E. HOLLIS JR.
BY
ATTORNEYS

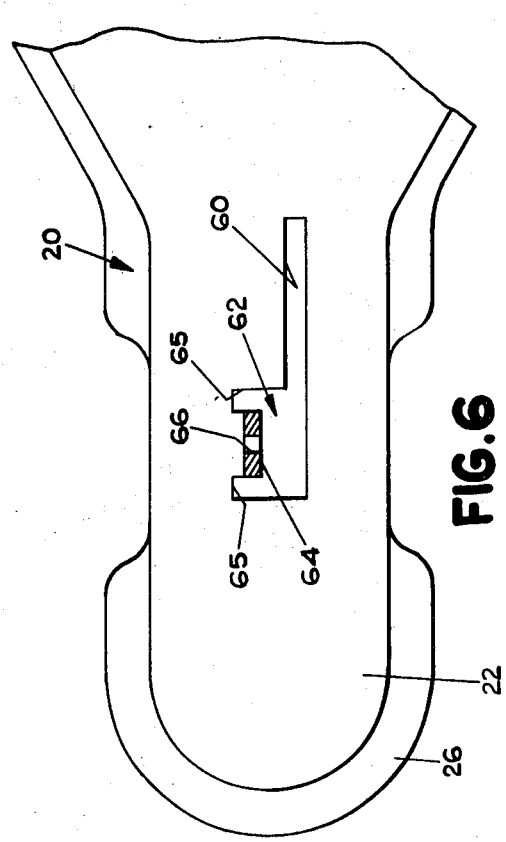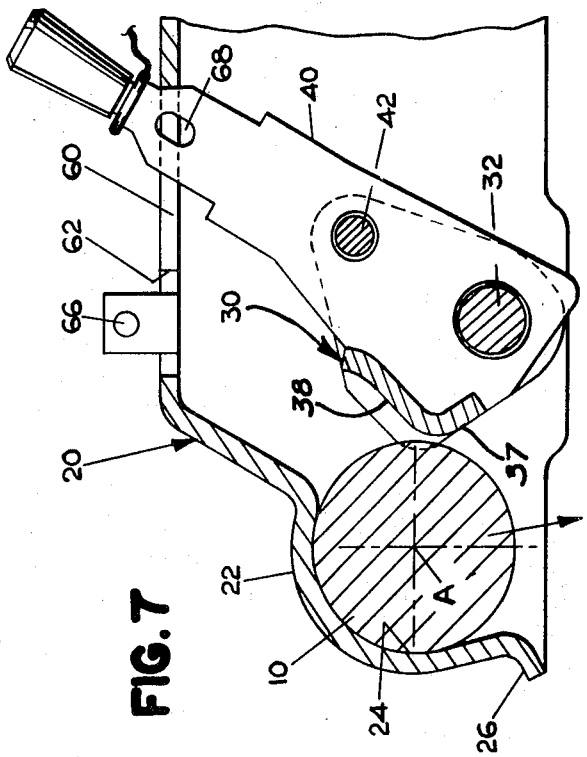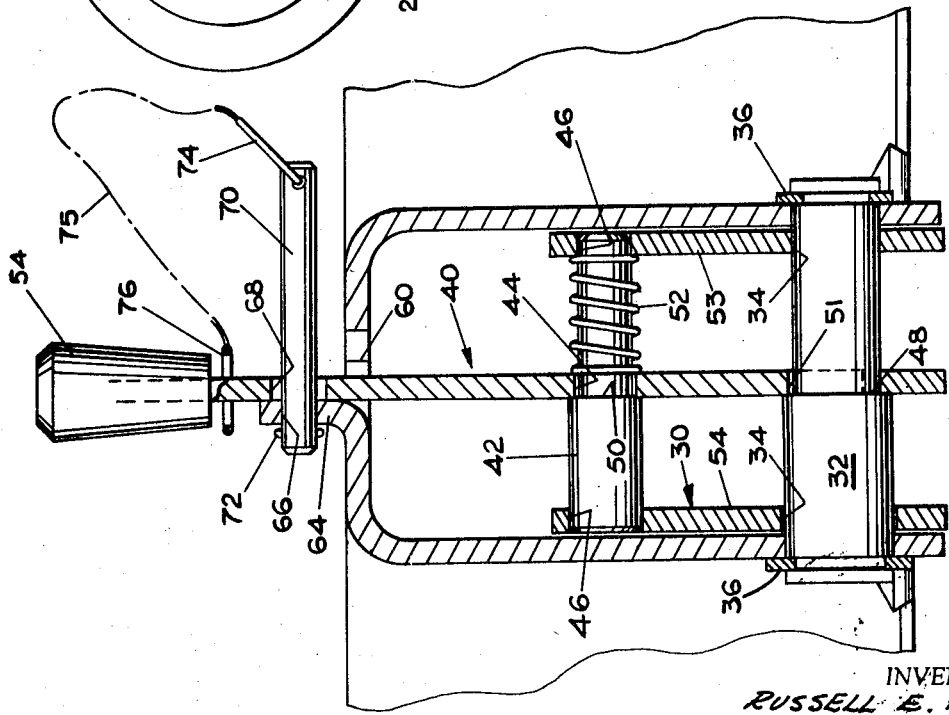

3,647,244

COUPLER FOR TRAILERS AND THE LIKE

BACKGROUND OF THE INVENTION

This invention relates to a coupler utilized to connect a towed vehicle to a towing vehicle, such as a trailer to an automobile, wherein a conventional ball-type hitch has been attached to the towing vehicle. More specifically, the invention concerns a safety coupler for coupling the towed vehicle to the ball wherein a locking jaw is so mounted as to provide a direct and positive wedging action which prevents the coupler from coming unlocked when the ball experiences a downward thrust relative to the coupler, of the type that would otherwise tend to disengage the ball from the coupler.

Earlier couplers have for the most part been characterized by a complexity of structure as well as by a lack of positive locking or wedging when the ball experiences forces which tend to downwardly disengage it from the coupler. For example, U.S. Pat. No. 2,854,256 discloses a locking jaw which pivots about an axis located below the center of the ball to be engaged, but because the jaw pivots downwardly to release the ball, there is no positive wedging or locking when the ball is thrust downwardly. In addition, the locking lever of this construction is connected to the jaw by a somewhat complicated linkage, making it an expensive device to manufacture. U.S. Pat. No. 3,163,445 and U.S. Pat. No. 2,823,931 both disclose couplers having wedging surfaces, but again the linkage from the locking lever to the wedging surface is quite complex, requiring additional structure which makes manufacturing of the coupler expensive and which generally complicates its function and makes its operation more difficult than it might otherwise be. Finally, U.S. Pat. No. 2,363,755 discloses a locking coupler utilizing a simplified linkage between the operating lever and the locking jaw, but the jaw and the lever pivot downwardly below the ball and thus do not provide a positive wedging action in the event the ball is thrust downwardly.

SUMMARY OF THE INVENTION

This invention provides a coupler for removably attaching a towed vehicle to a ball-type hitch mounted on a towing vehicle. Basically, the coupler comprises a housing, a socket integral with the housing and having a spherically configured surface to accommodate the ball, means for entrapping the ball against the spherical surface, a handle connected to the entrapping means, and a mounting for the entrapping means by which it and the handle are both pivotally mounted together within the housing and share the same axis of rotation. This axis is disposed lower than the center of the ball when the latter is engaged, and the entrapping means is pivotable upwardly with respect to the ball to disengage it therefrom. Also, the coupler has a means including a slot in the housing and a locking recess in such slot, for locking the handle to the housing when the entrapping means entraps the ball. The coupler further includes means for retaining the handle within such locking recess, including a spring biasing the handle into the recess, and a tab raised from the housing and having a pin-receiving hole therein disposed in alignment with a hole in the handle when the ball is engaged by the jaw.

Accordingly, it is an object of this invention to provide a safety coupler which provides positive wedging locking action even when a downward thrust of the ball occurs, and which nonetheless utilizes a simple construction which is economical to manufacture and easy to operate.

It is a further object to provide a coupler of the above character which has fewer moving parts than conventional couplers and which is therefore less expensive to manufacture, but which provides a structure of extreme strength and reliability.

It is a related object to provide a coupler of the above character wherein the locking jaw pivots upwardly to disengage.

Other objects and advantages of the invention will become apparent upon reference to the following drawings and detailed discussion.

BRIEF DESCRIPTION OF THE DRAWINGS

FIG. 4 is an enlarged, fragmentary sectional end elevation, taken generally along the plane IV—IV of FIG. 1 and illustrating the grip in place on the handle;

FIG. 6 is a fragmentary overhead plan view of the coupler housing, shown partially in section, taken along the plane VI—VI of FIG. 5; and FIG. 7 is a fragmentary sectional view similar to FIG. 2 except that the locking pin has been removed and the handle has been moved into position to release the ball.

DESCRIPTION OF THE PREFERRED EMBODIMENT

The coupler of the invention is utilized in connection with a ball-type hitch 10 (FIG. 2) of a conventional nature, which is mounted on a towing vehicle such as an automobile, the ball 10 being shown here for convenience as a sphere, without its bolt connection to the towing vehicle. The coupler 15 fits over the top of the ball, so that the latter is released by slipping downwardly and outwardly with respect to the coupler.

Figure 2:
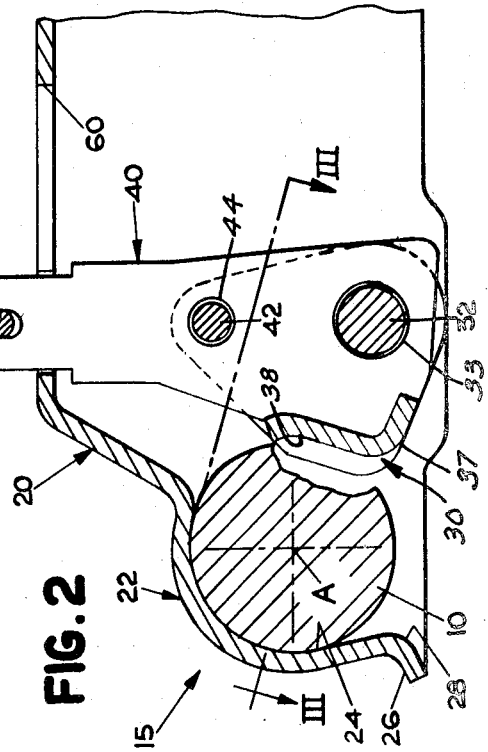
FIG. 2 is a fragmentary sectional side elevational view taken along the plane II—II of FIG. 1, the grip of the handle being now in place.

In accordance with the invention, the coupler has a housing 20 which attaches to the towed vehicle, the housing having (preferably as an integral part thereof) a socket 22 shaped with a spherical surface 24 to accommodate the ball 10. To guide the socket into position over the ball, a flared lip 26 extends outwardly from the socket. The bottom portion 28 of the socket, when the same is engaged with the ball 10, extends partially under the ball (FIG. 2).

To engage and lock the ball against the spherical surface 24, a movable jaw or tumbler 30 is pivotally mounted within the housing 20 on a pivot pin 32 passing through openings 34 in the jaw and through the opposite sides of the housing, the pin 32 preferably being circumferentially grooved at its ends to receive snap rings 36, although its ends may be peened or riveted to slightly overlap the sides of the housing (FIG. 4), or otherwise retained. In this connection, it is to be noted that the use of snap rings for this purpose is an unconventional factor, but one which has definite advantages from the point of view of assembly effort and labor savings. Of prime importance is the fact that the pivot pin 36 is disposed below the position which the center of the ball 10 (indicated as "A" in FIGS. 2 and 7) occupies when fully inserted into the socket. This insures a positive wedging action, as will be described hereinafter. To engage and retain the ball 10 in its inserted position, the jaw 30 has a saddle-shaped front shoulder 37, the forward portion 38 of which is generally cylindrically curved. The shoulder 37 extends under the rearward portion of the ball in the engaged position of the jaw, to prohibit downward as well as rearward movement of the ball.

To rotate the jaw 30, a handle 40 is attached thereto, by the aforementioned tumbler pivot pin 32, which passes through a lower opening 33 in the handle, and also by a pin 42 which passes through an opening 44 in the handle, the ends of the pin 42 extending into and terminating in openings 46 in the jaw 30 (FIG. 4). To prevent lateral movement of the handle 40 in one axial direction along the pins 32 and 42, shoulders 48 and 50 are provided on the pines by reducing their diameter along about one-half their length. The lower end of the handle is retained upon pin 32 and abuts against the shoulder 48 thereon, and the periphery of the opening 44 in the handle abuts against the shoulder 50 on pin 42. Thus, the handle 40 pivots about the pin 32, along with the jaw 30. It is to be noted that the lower periphery of the handle 40 is shaped, along the front and bottom, to fit contiguously into and against the interior of the tumbler or jaw 30. This strengthens the construction significantly, since rearward thrust against the tumbler is transferred to the handle at many points in addition to the pin 42. Also, the assembly is substantially error proofed, particularly by using different diameters for the pins 32 and 42, since the handle, tumbler and housing can really be put together only one way. The handle 40 is spring biased against both of the shoulders 48 and 50 by a coil spring 52 which is telescoped over pin 42 at its smaller diameter, and bears between one side 53 of the tumbler 30 and the side of handle 40 closest thereto. This spring is under compression at all times so as to always bias handle 40 toward an upright position against shoulders 48 and 50; thus, the handle may be moved to the right in FIG. 4, but whenever it is released the spring will always move it back to the center and against the shoulders.

Although it may be possible to construct the jaw or tumbler 30 in a number of specific ways, a highly preferred such way is, as indicated in the different figures, to form this member from sheet (or plate) metal, by a stamping operation. That is, the entire tumbler may be formed from a piece of metal plate which is initially flat and which has a somewhat hourglass or "dog bone" shape. This is accomplished by forcing the central part of such a piece downwardly into a female die whose side extremities bend the lateral ends of the piece perpendicularly upward to form the side legs 53 and 54 (FIG. 4) of the jaw and at the same time bend an edge part of the central portion of the piece upwardly to form the basic ball-entrapping portion 38. The piece is then struck with a curved die to give portion 38 its desired curved-ball-engaging shape. In this manner, an extremely strong part can be formed in a very inexpensive manner; furthermore, the cold working of the metal plate during the stamping operations, during which part of the metal is actually flowed under pressure, serves to temper and strengthen the metal. Of course, by use of a stamping process for the manufacture of the jaw, costly casting and/or machining operations such as are customarily used for a part such as this are entirely eliminated, as is a considerable bulk of metal.

Figure 3:
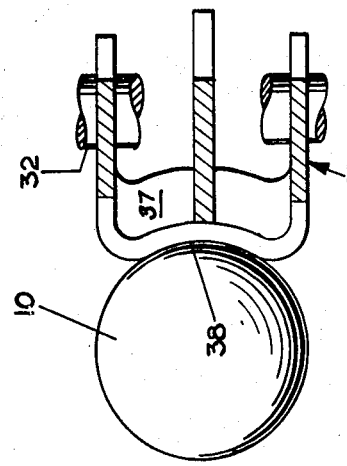
FIG. 3 is a fragmentary sectional plan view taken along the plane III—III of FIG. 2 with the handle and one pin removed.
Figure 5:
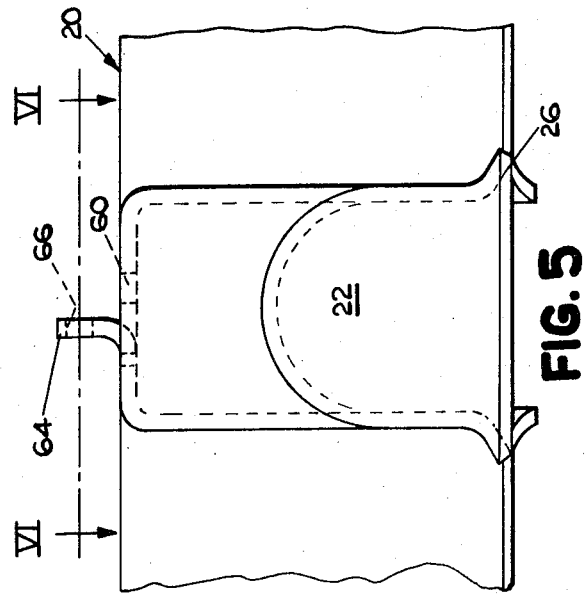
FIG. 5 is a fragmentary front elevational view of the coupler with the handle removed.
Figure 1:
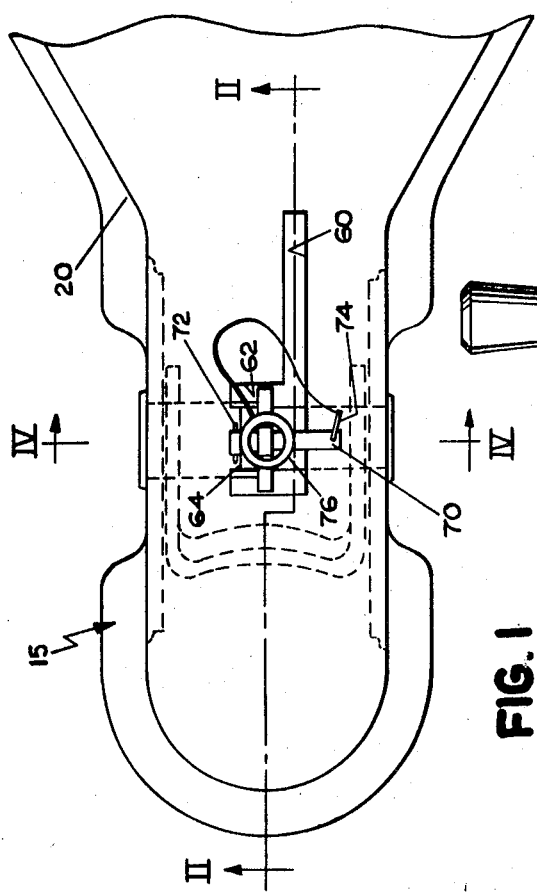
FIG. 1 is a fragmentary overhead plan view of a coupler constructed according to the invention, the grip of the handle having been removed.

The handle 40 extends upwardly through a slot 60 in the top of the housing 20, and to facilitate the use of the handle, a grip 54 is mounted at its top end, as by a press fit therebetween. In accordance with another aspect of the invention, the handle 40 may be locked in its forward position, wherein the engaging surface 38 of the jaw 30 engages the ball 10. For this purpose, the slot 60 at the top of the housing is somewhat L-shaped and forms an offset locking recess 62; more accurately, the slot is somewhat F-shaped, since the locking recess 62 has a pair of parallel slot portions resembling the crossbars of the letter "F" (FIG. 6). The handle 40 is sufficiently narrow at its top to fit into locking recess 62 toward which it is biased by spring 52. When so positioned, the handle is effectively locked, thus holding the jaw 30 in retaining engagement with the ball 10. The locking recess is preferably formed by lancing the upper part of the housing from its underside with a chisel lance having a sloping face between two parallel cutter portions extending rearwardly of such sloping face, thereby forming an upstanding tab 64 on the top of the housing. In the initial stage of the lancing operation, the tab is flush with the top part of the housing. However, the sloping chisel face of the lance disposed between the two cutter portions follows the cutters upwardly and forces the tab laterally, so as to bend it into an upstanding position between the horizontal bars of the F-shaped slot 60 (FIGS. 5 and 6). This tab can only be formed in a single operation with the cutting of the recess 62 if the latter cutting is done so that the ends 65 of the recess 62 extend beyond the point where the tab is raised upwardly from the housing, since the extended ends 65 provide needed stress relief for the bending operation and prevent tearing at the base of the tab. Thus, the F-shape of the slot allows it to be manufactured with great economy in a single lancing step.

In accordance with still another aspect of the invention, to provide a safety lock for the handle 40 the tab 64 has a hole 66 and the handle has a similar hole 68 which is in registration with opening 66 when the handle 40 is in the recess 62. To maintain the openings 66 and 68 in such alignment, and to thereby prevent the handle 40 from unintentionally being moved out of the locking recess 62, a retainer pin 70 is slidable through the openings 66 and 68, the pin preferably having conventional outwardly biased ball members 72 at one end to normally retain the pin in the opening 66. When desired, the pin can be removed by deliberately pulling it outward, at which time the ball members 72 are forced to recede into the pin 70. At the other end of the pin, a ring 74 is attached to a light cable or chain 75 which is connected to the handle 40 by means of a ring 76 seated beneath the grip 54. Thus, when the hitch ball of the towing vehicle has been engaged by the surface 38 of the jaw 30, the handle is positioned within the locking recess with the openings 66 and 68 in registration, and the pin 70 is inserted so that the ball members 72 extend outwardly behind the tab 64, adjacent its opening 66.

The basic ball-entrapping action of the movable jaw 30 is provided by locating the jaw, and the handle 40 which pivots it, adjacent the position occupied by the ball 10 but generally opposite the spherical surface 24 of the housing, at the rear of the socket 22 defined thereby. Because the pivot pin 32 is located below the center "A" of the ball, when the jaw 30 is pivoted into position to entrap the ball it pivots downwardly, so that the arcuate jaw surface 38 and the knee or shoulder portion 37 at the bottom thereof acts as a wedge, inasmuch as the shoulder portion then extends inwardly below the rear part of the ball to prevent the latter from moving downwardly (FIG. 2). More particularly, any downward force on the ball tends to move the jaw in a further counterclockwise direction, but this places the lower part of the jaw under direct compressive loading against the heavy pivot pin 32, which is below the center of the ball, by which any such further rotation of the jaw is positively prohibited. In this operation, the rearwardly curved lower portion 28 of the ball socket facilitates the wedging locking action of the jaw, but the basic design is not dependent on the presence of such a portion, since even if the front of the housing was basically vertical the jaw would still operate in the same fundamental way to positively entrap the ball within the socket. Of course, the handle 40 is also prohibited from moving any further forwardly of the housing by abutting the end of the slot 60, and this acts to even further lock the jaw in its entrapping position.

The ball is released from the housing socket by rotating the jaw 30 in a clockwise direction (FIG. 7), thereby moving the ball-engaging surface 38 upwardly and away from the ball. This is done by pressing the handle 40 laterally against the spring 52 and then pulling the handle back in the slot 60 away from the recess 62. It will be readily seen that the operation of the coupler is extremely simple, in view of the fact that the handle occupies only two positions, one of which is spring-biased.

While the invention has been described in connection with a preferred embodiment, it will be understood that in its broader aspects, the invention is not limited to the structure specifically described. For example, the surface 38 of the movable jaw 30 need not be cylindrical, as long as it engages the ball 10 by a bottom portion which extends below and underneath the ball. Furthermore, relative terms used herein to denote direction or position, such as "above," "below," etc., are to be construed in the context of the invention, and not necessarily in a strict literal sense. Therefore, any alternatives, modifications and equivalents which may be derived by others should be viewed with respect to the spirit and concept of the invention, and not merely with respect to the specific structures shown and described herein.

The embodiments of the invention in which an exclusive property or privilege is claimed are defined as follows:

1. A trailer coupler for removably attaching a towed vehicle to a ball-type hitch mounted on a towing vehicle; said coupler comprising: a housing having a socket of a size and shape to receive the ball and enclose the top front and side portions thereof but being open at the rear portion of the ball to leave the latter essentially free in a rearward direction of the housing; means mounted upon said housing for entrapping the ball within said socket by movement generally forwardly of the housing toward the socket and beneath a ball disposed therein; a handle operatively connected to said entrapping means to move the latter toward and away from said socket along a predetermined path wherein such means is disposed at least partially below the center of the ball when the same is entrapped within said housing socket; said entrapping means mounted to be moved by said handle upwardly and away from said ball and said socket to disentrap the ball from the latter; said entrapping means including a pivotal jaw having a pivot axis disposed below the center of a ball entrapped in said socket and having a ball-engaging face which extends both above and below a line between the center of the entrapped ball and said pivot axis, such that said pivotal jaw forms a complete dead center toggle link between the ball and the pivot axis to lock the entrapped ball in said housing socket and prevent movement of the ball rearwardly of the housing at the said open portion of the socket.

2. The trailer coupler defined in claim 1, wherein said handle is coupled to said jaw for pivotal movement therewith and has substantially the same pivot axis.

3. The trailer coupler defined in claim 2, wherein said housing defines an elongated slot disposed above said jaw, and said handle extends upwardly through said slot, said slot having limiting extremities for abutment by said handle to limit allowable pivotal movement of said jaw.

4. The trailer coupler defined in claim 3, wherein said slot has an offset portion for engaging said handle in the ball-entrapping position of said jaw and limiting movement of the handle away from such position by direct abutment.

5. The trailer coupler defined in claim 4, including means for biasing said handle into said offset slot position.

6. The trailer coupler defined in claim 4, wherein said housing has an upstanding tab disposed generally adjacent said handle when the same is so engaged.

7. The trailer coupler defined in claim 6, wherein said handle and said tab define registering openings for receiving an interlock member.

8. The trailer coupler defined in claim 6, wherein said slot is generally F-shaped, having a pair of spaced lateral slot portions disposed in flanking relation to said tab.

9. In a coupler for a ball-type trailer hitch, of the type having a housing with a ball-receiving receptacle portion and a tumbler member movably mounted upon said housing to entrap a ball positioned within said receptacle portion, the improvement wherein said tumbler member has a ball-engaging forward wall of predetermined thickness, said wall having exposed front and rear surfaces, each of predetermined surface configuration; and a handlelike operator element engaging said tumbler member and extending generally upwardly beyond said housing, for operatively moving said tumbler; said operator element having a configured lower portion whose shape is complementary to the said surface configuration of the rear surface of said tumbler member forward wall and which is nestingly interfitted against the latter; and means holding said operator element lower portion and said tumbler member forward wall in said interfitted relationship.

* * * * *